US011626649B2

(12) United States Patent
Altero et al.

(10) Patent No.: US 11,626,649 B2
(45) Date of Patent: Apr. 11, 2023

(54) WEDGE BATTERY TERMINAL

(71) Applicant: TE Connectivity Brasil Industria De Electronicos, Braganca Paulista (BR)

(72) Inventors: Luis Altero, Braganca Paulista (BR); Gustavo Bonucci, Braganca Paulista (BR); Agnelo Bartolomeu Cavallaro, Itatiba (BR); Rafael Kazuo Sato T Leme, Braganca Paulista (BR)

(73) Assignee: TE Connectivity Brasil Industria De Eletronicos LTDA, Sao Paulo (BR)

( * ) Notice: Subject to any disclaimer, the term of this patent is extended or adjusted under 35 U.S.C. 154(b) by 227 days.

(21) Appl. No.: 17/065,185

(22) Filed: Oct. 7, 2020

(65) Prior Publication Data

US 2022/0109135 A1 Apr. 7, 2022

(51) Int. Cl.
*H01M 50/543* (2021.01)
*H01M 50/172* (2021.01)

(52) U.S. Cl.
CPC ....... *H01M 50/543* (2021.01); *H01M 50/172* (2021.01)

(58) Field of Classification Search
None
See application file for complete search history.

(56) References Cited

U.S. PATENT DOCUMENTS

2009/0191454 A1\* 7/2009 Detter ................ H01M 50/502
29/874

\* cited by examiner

*Primary Examiner* — Carmen V Lyles-Irving

(57) ABSTRACT

A battery terminal connector assembly includes a first post engagement portion and a second post engagement portion. The first post engagement portion has a first opening for receiving the battery terminal post therein. The second post engagement portion has a second opening for receiving the battery terminal post therein. The first post engagement portion is movable relative to the second post engagement portion and the first post engagement portion and the second post engagement portion are movable relative to the battery terminal post as the first post engagement portion and the second post engagement portion are moved between a first insertion position and a second termination position.

13 Claims, 5 Drawing Sheets

WEDGE BATTERY TERMINAL

FIELD OF THE INVENTION

The present invention is directed a battery terminal for terminating to a battery terminal post. In particular, the invention is directed to a battery terminal with has wedge members to facilitate termination of the battery terminal to the battery terminal post.

BACKGROUND OF THE INVENTION

Batteries are used as a mobile source of power for a wide variety of devices and equipment. Batteries are also used in many vehicles and other types of equipment to ignite a combustion engine. For those devices in which a battery is used, the terminals of the battery are electrically connected to the electrical system in that device equipment or vehicle. Thus, battery terminal connectors are required for connecting the battery to an electrical system in, for example, an automobile, watercraft, recreational vehicle, tractor, truck, lawn mower, etc.

Periodically, it is necessary for a battery to be replaced. This may occur because the battery loses the capacity to function properly by being depleted of its charge. In some cases, such as in an automobile, the battery is normally recharged during operation of the device that battery serves. However, even where the battery is rechargeable, it will eventually, through wear and tear, become unable to accept and maintain a charge and will have to be replaced. Additionally, when work is being done on or near the electrical system of, for example, a vehicle, it may be a wise precaution to disconnect the battery from the electrical system to prevent the possibility of being shocked or having an electrical surge damage tools or the equipment being serviced.

Battery cables are typically attached to the terminal post of a battery using a clamp type battery connector. These connectors include a conductor terminating portion for accommodating a stripped end of the battery cable, a post-engaging portion for engaging the battery terminal post and a clamping portion which is tightened around the terminal post to provide secure connection thereto. The clamping portion of most battery connectors includes a pair of arms defining a circular portion therebetween which may be positioned around the battery terminal post. The ends of the arms may be brought together with a fastening device such as a nut and bolt or a camming member to tightly secure the arms about the battery post.

However, even when the clamping portion is tightened, such battery terminals may move or slide relative to the terminal post in environments in which vibration and the like occurs, for example in vehicle engines. This is particularly true for terminal posts which have a tapered profile. As both the inside surface of the post-engaging portion and the outside surface of the terminal post are relative smooth, relative movement over time can occur. In order to prevent this movement, various battery terminals have included ridges or dimples on the inside surface of the post-engaging portion. The ridges or dimples are adapted to penetrate the terminal post when the clamping portion is clamped thereto. While this provides additional retention, the penetration of the terminal post by the ridges or dimples damages the terminal post during the lifetime of the battery.

Further designs may include multiple wedge blocks that are translated against each other to apply a clamping force about a clamp which is positioned around the terminal post. Again, such designs may lead to inadequate translation of a force from the nut torque to the clamping mechanism positioned around the battery post such that an inadequate amount of clamping force is provided.

It would, therefore, be beneficial to provide a battery terminal which facilitates termination of the battery terminal to the battery terminal post and which provides sufficient retention without damaging the terminal post or the battery.

SUMMARY OF THE INVENTION

An embodiment is directed to a battery terminal connector assembly for attaching to a terminal post of a battery, the battery terminal connector assembly includes a first post engagement portion and a second post engagement portion. The first post engagement portion has a first terminal post receiving opening for receiving the battery terminal post therein. The second post engagement portion has a second terminal post receiving opening for receiving the battery terminal post therein. The first post engagement portion is movable relative to the second post engagement portion as the first post engagement portion and the second post engagement portion are moved between a first insertion position and a second termination position. The first post engagement portion and the second post engagement portion are movable relative to the battery terminal post as the first post engagement portion and the second post engagement portion are moved between the first insertion position and the second termination position.

An embodiment is directed to a battery terminal connector assembly for attaching to a terminal post of a battery, the battery terminal connector assembly includes a first post engagement portion, a second post engagement portion, a wedge portion, a fastening post and a fastening member. The first post engagement portion has a first terminal receiving opening for receiving the battery terminal post and a first fastening post opening. The second post engagement portion has a second terminal receiving opening for receiving the battery terminal post and a second fastening post opening. The wedge portion is provided on at least one of the first post engagement portion or the second post engagement portion. The fastening post extends through the first fastening post opening and the second fastening post opening. The fastening member is inserted on the fastening post wherein as the fastening member is tightened on the fastening post, the wedge portion translates a downward force imparted by the fastening member to a horizontal force moving the first post engagement portion and the second post engagement portion into engagement with the battery terminal post.

An embodiment is directed to a battery terminal connector assembly for attaching to a terminal post of a battery, the battery terminal connector assembly includes a first post engagement portion, a second post engagement portion, a fastening post and a fastening member. The first post engagement portion has a first terminal receiving opening for receiving the battery terminal post and a first fastening post opening for receiving the fastening post. The second post engagement portion has a second terminal receiving opening for receiving the battery terminal post and a second fastening post opening for receiving the fastening post. The second post engagement portion has angled slide surfaces. The fastening member is inserted on the fastening post and contacts an upper surface of the first post engagement portion and imparts a downward force on the first post engagement portion causing first post engagement portion to engage the angled slide surface and translate the downward force to a horizontal force moving the first post engagement portion and the second post engagement portion into engagement with the battery terminal post.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
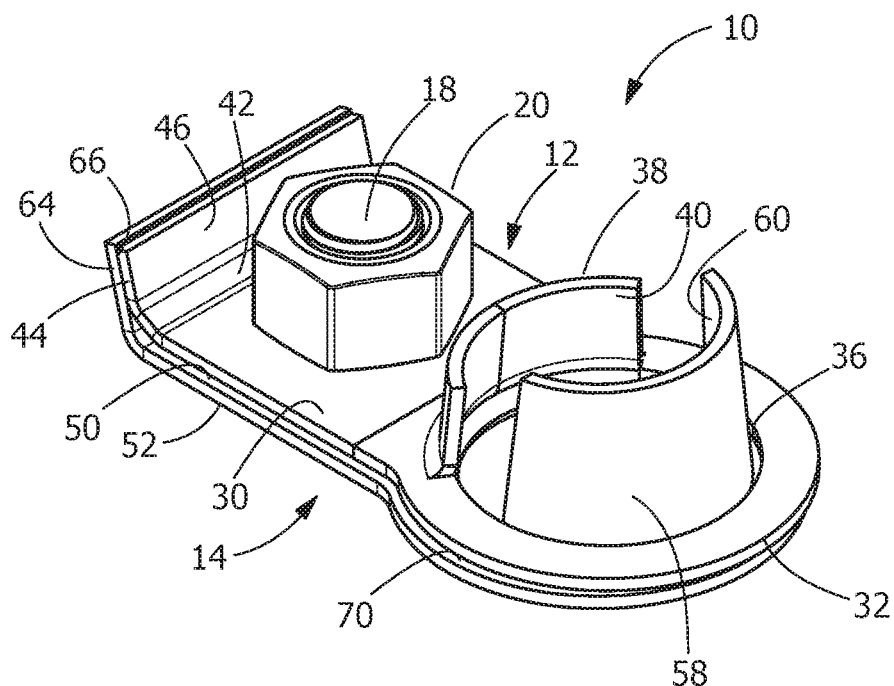
FIG. 1 is a top perspective view of an illustrative embodiment of a battery terminal according to the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Figure 2:
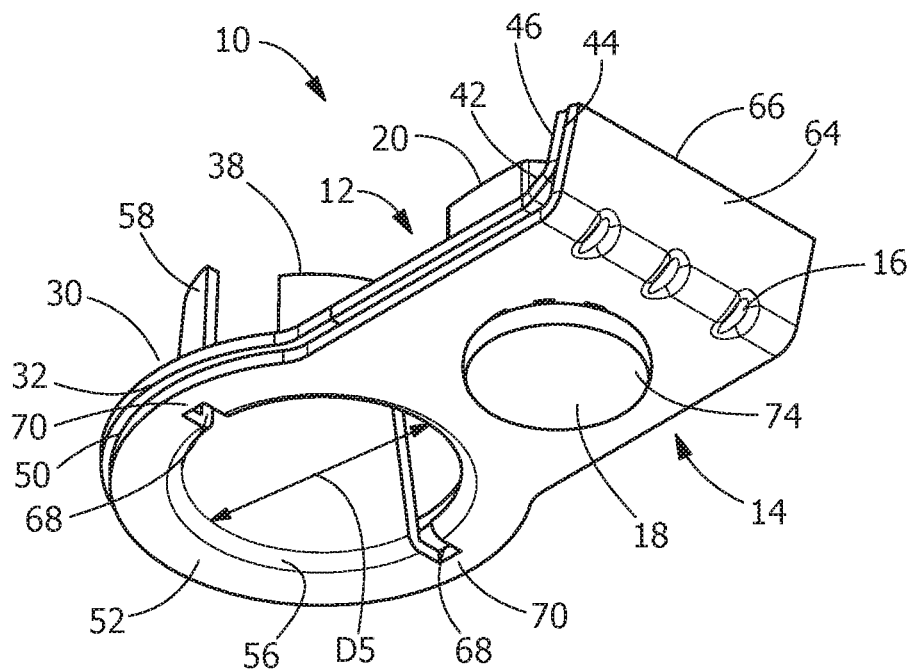
FIG. 2 is a bottom perspective view of the battery terminal of FIG. 1.

Referring to FIGS. 1 and 2, an illustrative embodiment of a battery terminal connector assembly 10 of the present invention is shown. The connector assembly 10 includes a first post engagement portion 12, a second post engagement portion 14, a wedge portion 16, a fastening post 18 and a fastening member 20.

Figure 3:
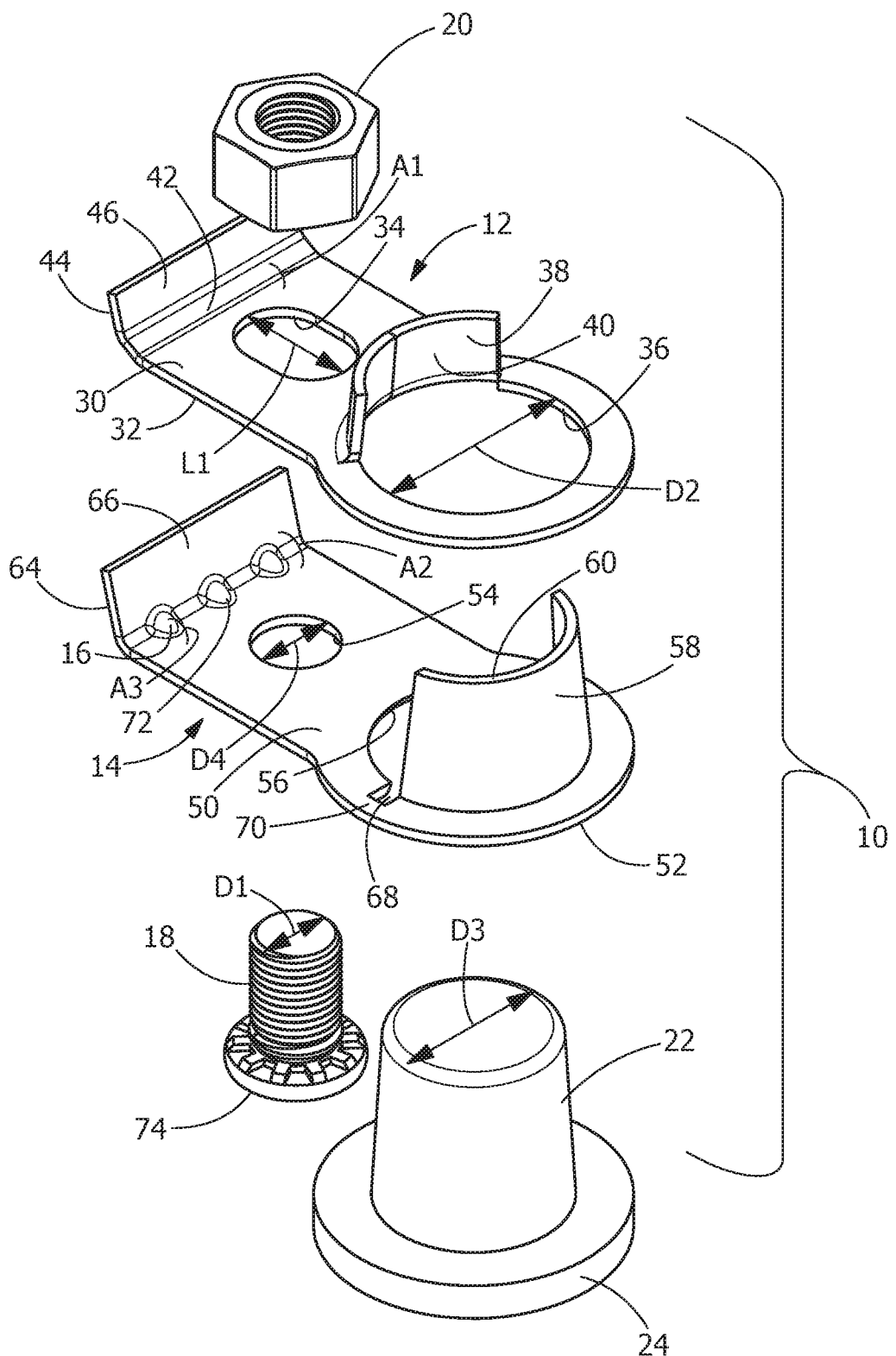
FIG. 3 is an exploded perspective view of the battery terminal of FIG. 1.

The first post engagement portion 12 has a first or upper surface 30 and an oppositely facing second or lower surface 32. The first post engagement portion 12 is made from electrically conductive material, such as, but not limited brass. A fastening post receiving opening 34 extends from the first surface 30 to the second surface 32. The opening 34 has an oblong configuration, as shown in FIG. 3. The opening 34 has a length L1 which is larger than the diameter D1 of the fastening post 18. However, the opening 34 may have different configurations.

Figure 8:
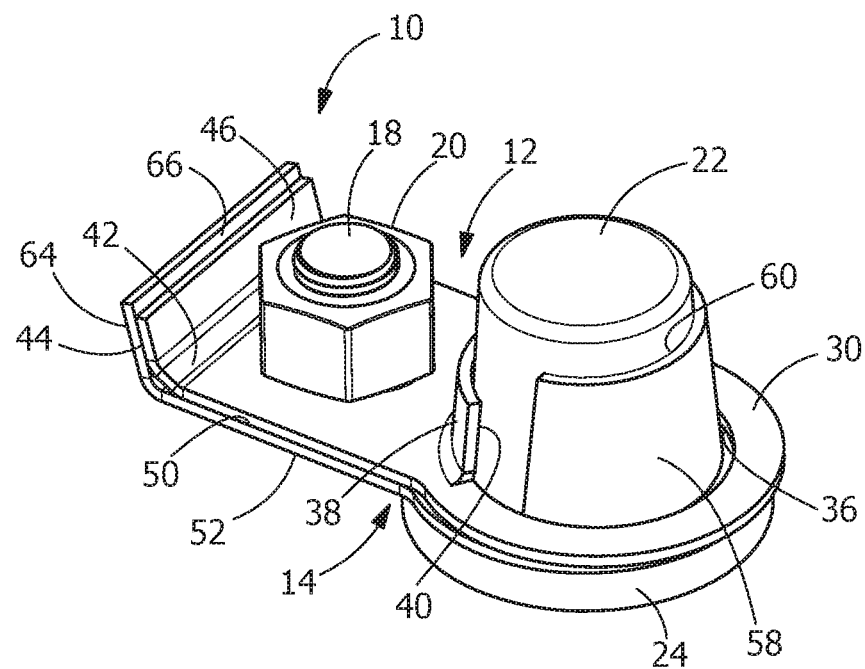
FIG. 8 is side perspective view of the battery terminal inserted onto a battery terminal with the fastening member positioned on the fastening post, the battery terminal is shown in a fully engaged or termination position.
Figure 9:
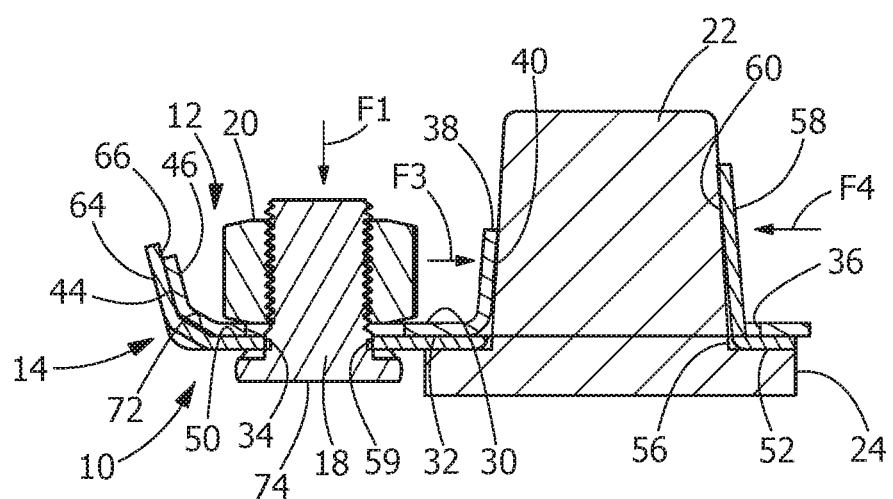
FIG. 9 is a cross-sectional view taken along line 9-9 of FIG. 8.

A terminal post receiving opening 36 extends from the first surface 30 to the second surface 32. The terminal post receiving opening 36 is spaced from the fastening post receiving opening 34. The diameter D2 of the terminal post receiving opening 36 is larger than the diameter D3 of a terminal post 22 onto which the first post engagement portion 12 is inserted. An arcuate or radiused engagement wall 38 extends about a portion of the circumference of the terminal post receiving opening 36. The engagement wall 38 extends from the first surface 30 in a direction away from the second surface 32. The engagement wall 38 has an inner surface 40 which is configured to engage the terminal post 22 when the battery terminal connector assembly 10 is moved to the fully terminated position, as shown in FIGS. 8 and 9, as will be more fully described.

An angled surface 42 is positioned at an end 44 of the first post engagement portion 12. The angled surface 42 is angled relative to the first surface 30 at an angle A1 (FIG. 3) which is greater than 90 degrees but less than 180 degrees. An end wall 46 extends from extends from the angled surface 42 of the first post engagement portion 12 in a direction away from the second surface 32. In the embodiment shown the end wall 46 extends in a direction which is less than 180 degrees relative to the first surface 30.

The second post engagement portion 14 has a first or upper surface 50 and an oppositely facing second or lower surface 52. The second post engagement portion 14 is made from electrically conductive material, such as, but not limited brass. A fastening post receiving opening 54 extends from the first surface 50 to the second surface 52. The opening 54 has a circular configuration, as shown in FIG. 3. The opening 54 has a diameter D4 which is approximately equal to the diameter D1 of the fastening post 18. However, the opening 54 may have different configurations.

A terminal post receiving opening 56 extends from the first surface 50 to the second surface 52. The terminal post receiving opening 56 is spaced from the fastening post receiving opening 54. The diameter D5 of the terminal post receiving opening 56 is approximately equal to the diameter D3 of the terminal post 22 onto which the second post engagement portion 14 is inserted. An arcuate or radiused engagement wall 58 extends about a portion of the circumference of the terminal post receiving opening 56. The engagement wall 58 extends from the first surface 50 in a direction away from the second surface 52. The engagement wall 58 has an inner surface 60 which is configured to engage the terminal post 22 when the battery terminal connector assembly 10 is moved to the fully terminated position, as shown in FIGS. 8 and 9, as will be more fully described.

An angled end wall 66 is positioned at an end 64 of the second post engagement portion 14. The angled end wall 66 is angled relative to the first surface 50 at an angle A2 (FIG. 3) which is greater than 90 degrees but less than 180 degrees.

Cut outs or relief openings 68 are provided proximate the engagement wall 58 of the second post engagement portion 14. The openings 68 extend from the first surface 50 to the second surface 52 of the second post engagement portion 14. As shown in FIG. 3, the openings 68 extend outwardly from the terminal post receiving opening 56. Weakened portions 70 of the second post engagement portion 14 are formed by the positioning of the openings 68.

In the embodiment shown, wedge members or portions 16 are positioned on the second post engagement portions 14. However, the wedge portions 16 may be provided on the first post engagement portions 12 or may be a separate piece. As shown in FIG. 3, the wedge portions 16 extend between the angled end wall 66 and the first surface 50. The wedge portions 16 have angled slide surfaces 72 which extend at angle A3 from the first surface 50 of greater than 90 degrees but less than 180 degrees. In the embodiment shown, three wedge portions 16 are provided, however, other numbers of wedge portions 16 may be used.

The fastening post 18 may be a threaded bolt that is rotationally fixed. The fastening post 18 may be rotationally fixed by securing a head 74 of the fastening post 18 such that it cannot spin or rotate. The fastening member 20, such as, but not limited to, a nut, is threaded on the fastening post 18. A conductor termination member (not shown) or other component may be attached to the fastening post 18.

Figure 4:
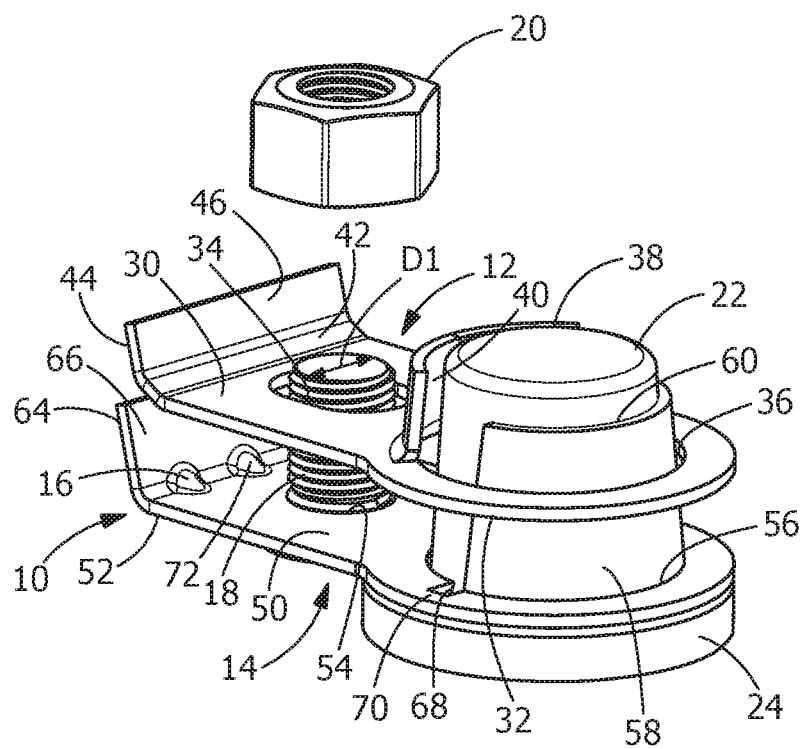
FIG. 4 is side perspective view of the battery terminal inserted onto a battery terminal post in an initial or insertion position prior to the insertion of a fastening member onto a fastening post.
Figure 5:
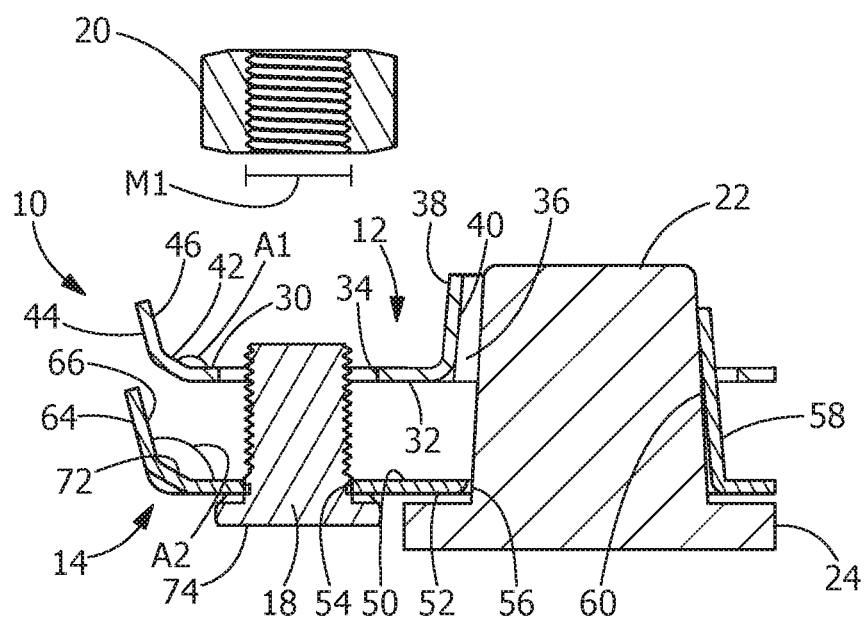
FIG. 5 is a cross-sectional view taken along line 5-5 of FIG. 4.
Figure 6:
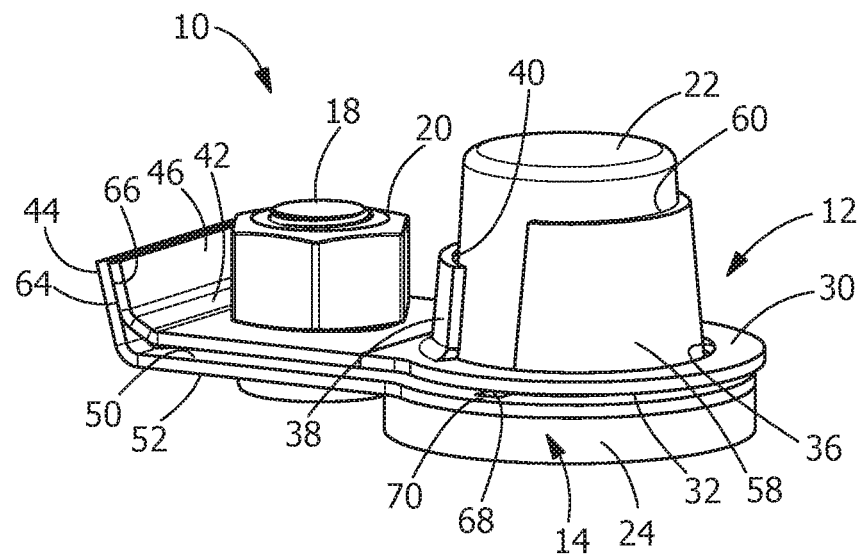
FIG. 6 is side perspective view of the battery terminal inserted onto a battery terminal with the fastening member positioned on the fastening post, the battery terminal is shown intermediate position.

Referring to FIGS. 4 through 9, the operation of the battery connector assembly 10 will be described. As shown in FIGS. 4 and 5, the battery connector assembly 10 is inserted onto the battery terminal post 22 when the battery connector assembly 10 is an the initial or insertion position. In this initial position, the fastening member 20 is not tightened, thereby allowing the first post engagement portion 12 to be movable relative to the second post engagement portion 14. As the fastening post receiving opening 54 is larger than the fastening post 18, as previously described, the first post engagement portion 12 can move in direction indicated by arrow M1 shown in FIG. 4. This allows the first post engagement portion 12 to move relative to the fastening post 18, the second post engagement portion 14 and the battery terminal post 22 as the battery connector assembly 10 is moved onto the battery terminal post 22.

This allows the space provided between the inner surface 40 of the engagement wall 38 of the first post engagement portion 12 and the inner surface 60 of the engagement wall 58 of the second post engagement portion 14 to be larger than the diameter D3 of a terminal post 22, allowing the battery connector assembly 10 to be easily inserted onto the battery terminal post 22. The battery connector assembly 10 is inserted onto the terminal post 22 until the second surface 52 of the battery connector assembly 10 engages or is positioned proximate a base 24 of the terminal post 22.

Figure 7:
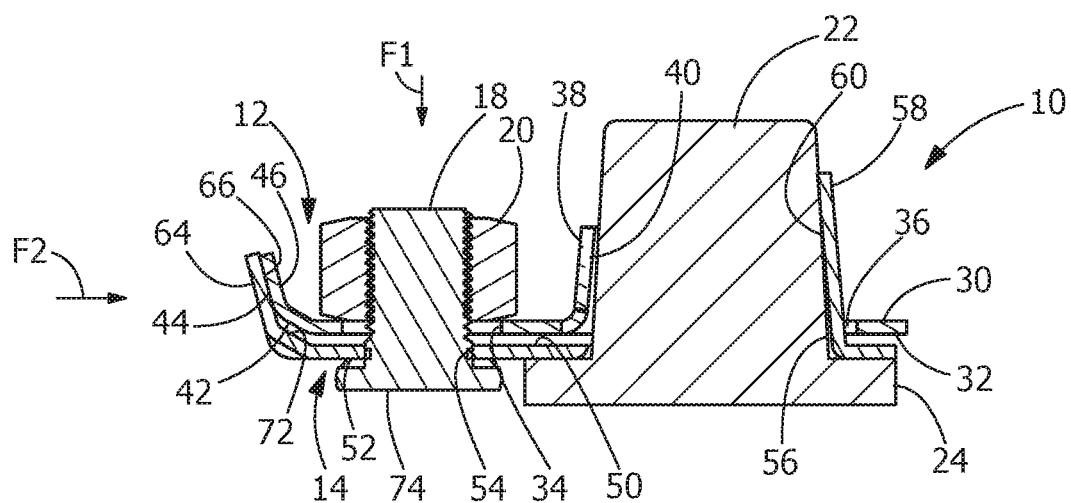
FIG. 7 is a cross-sectional view taken along line 7-7 of FIG. 6.

With the battery connector assembly 10 properly positioned on the battery terminal post 22 in the initial position, the fastening member 20 is tightened on the terminal post 22. As this occurs, the fastening member 20 engages the first surface 30 of the first post engagement portion 12. Continued tightening of the fastening member 20 imparts a downward force F1 on the first post engagement portion 12, as shown in FIG. 7. This causes the angled surface 42 of the first post engagement portion 12 to engage and slide across the angled slide surfaces 72 of the wedge portions 16 which are attached to the second post engagement portion 14. The engagement of the angled surface 42 the angled slide surfaces 72 translates the downward force F1 to a horizontal force F2 moving the engagement wall 38 of the first post engagement portion 12 toward the terminal post 22.

Continued tightening of the fastening member 20 continues to apply the downward force F1 on the first post engagement portion 12 with continued movement and force F2 horizontally of the first post engagement portion 12. This continues until the engagement wall 38 of the first post engagement portion 12 is positioned in the fully engaged or termination position, as shown in FIG. 8. In this position, the inner surface 40 of the engagement wall 38 exerts a force F3 on the battery terminal post 22. With the engagement wall 38 prevented from further movement toward the battery terminal post 22, the downward force applied by the continued tightening of the fastening member 20 causes the angled surface 42 of the first post engagement portion 12 to force the angled slide surfaces 72 and the second post engagement portion 14 in the direction of F4, moving the inner surface 60 of the engagement wall 58 into mechanical and electrical engagement with the battery terminal post 22.

Tightening of the fastening member 20 continues until the spacing between the inner surface 40 of the engagement wall 38 and the inner surface 60 of the engagement wall 58 is essentially equal to the diameter D3 of the terminal post 22.

The weakened portions 70 prevent overtightening of the battery connector assembly 10 on the battery terminal post 22, as the weakened portions 70 can be resiliently deformed to accommodate excess force. The total forces provided by the inner surface 40 of the engagement wall 38 and the inner surface 60 of the engagement wall 58 and the weakened portions 70 creates an evenly distributed, controlled, specific and repeatable force which in turn provides a controlled, specific and repeatable mechanical and electrical connection between the battery connector assembly 10 and the terminal post 22, without causing damage to the terminal post 22. The retention forces exerted by the battery connector assembly 10 provide sufficient retention force to prevent the unwanted movement of the battery connector assembly 10 relative to the terminal post 22 even in environments where the terminal post 22 and the battery connector assembly 10 are subjected to harsh vibrations and the like.

The battery connector assembly 10 of the present invention may be sized to accommodate different sized terminal posts 22. For example, the positive terminal may have a different diameter from the negative battery terminal. The first post engagement portion 12 and the second post engagement portion 14 of the battery connector assembly 10 can be scaled or dimensioned to accommodate either the positive or negative terminal posts. In these instances, the battery connector assembly 10 may also be color coded to indicate which size and which terminal is to be used with each connector.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A battery terminal connector assembly for attaching to a terminal post of a battery, the battery terminal connector assembly comprising:

a first post engagement portion having a first terminal post receiving opening for receiving the battery terminal post therein, the first post engagement portion having a first fastening post receiving opening, a first angled surface positioned at an end of the first post engagement portion;

a second post engagement portion having a second terminal post receiving opening for receiving the battery terminal post therein, a second angled end wall positioned at an end of the second post engagement portion;

the first post engagement portion being movable relative to the second post engagement portion as the first post engagement portion and the second post engagement portion are moved between a first insertion position and a second termination position;

wherein as the first post engagement portion and the second post engagement portion are moved between the first insertion position and the second termination position, the first angled surface engages the second angled end wall to force the first post engagement portion to move relative to the second post engagement portion and the battery terminal post to secure the first post engagement portion and the second engagement portion to the terminal post of the battery.

2. The battery terminal connector assembly as recited in claim 1, wherein the first post engagement portion has a first fastening post receiving opening with an oblong configuration, the first fastening post receiving opening has a length which is larger than a diameter of a fastening post inserted into the first fastening post receiving opening.

3. The battery terminal connector assembly as recited in claim 2, wherein the second post engagement portion has a second fastening post receiving opening with a circular configuration, the second fastening post receiving opening has a diameter which is equal to the diameter of the fastening post inserted into the second fastening post receiving opening.

4. The battery terminal connector assembly as recited in claim 1, wherein the first terminal post receiving opening has a diameter which is larger than a diameter of the battery terminal post.

5. The battery terminal connector assembly as recited in claim 4, wherein a first arcuate engagement wall extends about a portion of the circumference of the first terminal post receiving opening.

6. The battery terminal connector assembly as recited in claim 5, wherein the first arcuate engagement wall has a first inner surface which is configured to engage the battery terminal post when the first post engagement portion and the second post engagement portion are moved to the second termination position.

7. The battery terminal connector assembly as recited in claim 6, wherein the second terminal post receiving opening has a diameter which is equal to the diameter of the battery terminal post.

8. The battery terminal connector assembly as recited in claim 7, wherein a second arcuate engagement wall extends about a portion of the circumference of the second terminal post receiving opening.

9. The battery terminal connector assembly as recited in claim 8, wherein the second arcuate engagement wall has a second inner surface which is configured to engage the battery terminal post when the first post engagement portion and the second post engagement portion are moved to the second termination position.

10. The battery terminal connector assembly as recited in claim 9, wherein relief openings are provided proximate the second arcuate engagement wall of the second post engagement portion, the relief openings extend outwardly from the second terminal post receiving opening.

11. The battery terminal connector assembly as recited in claim 10, wherein weakened portions of the second post engagement portion are positioned proximate the relief openings.

12. The battery terminal connector assembly as recited in claim 1, wherein a first end wall extends from the first angled surface of the first post engagement portion.

13. The battery terminal connector assembly as recited in claim 1, wherein wedge members are positioned on the second post engagement portion, the wedge portions have angled slide surfaces.

* * * * *